(12) United States Patent
Chalmers et al.

(10) Patent No.: US 10,865,911 B2
(45) Date of Patent: *Dec. 15, 2020

(54) METHOD OF INSTALLING AN IN-LINE STRUCTURE IN A PIPELINE

(71) Applicant: TECHNIP FRANCE, Courbevoie (FR)

(72) Inventors: Martin Chalmers, Aberdeenshire (GB); Tomasz Tkaczyk, Aberdeenshire (GB)

(73) Assignee: TECHNIP FRANCE

( * ) Notice: Subject to any disclaimer, the term of this patent is extended or adjusted under 35 U.S.C. 154(b) by 39 days.

This patent is subject to a terminal disclaimer.

(21) Appl. No.: 16/333,656

(22) PCT Filed: Sep. 12, 2017

(86) PCT No.: PCT/IB2017/001367
§ 371 (c)(1),
(2) Date: Mar. 15, 2019

(87) PCT Pub. No.: WO2018/051191
PCT Pub. Date: Mar. 22, 2018

(65) Prior Publication Data
US 2019/0257448 A1 Aug. 22, 2019
US 2020/0248841 A9 Aug. 6, 2020

(30) Foreign Application Priority Data

Sep. 16, 2016 (GB) .................................. 1615841.2

(51) Int. Cl.
*F16L 1/20* (2006.01)
*F16L 101/20* (2006.01)
(Continued)

(52) U.S. Cl.
CPC ................ *F16L 1/207* (2013.01); *F16L 1/12* (2013.01); *F16L 1/16* (2013.01); *F16L 2101/20* (2013.01); *Y10T 137/6123* (2015.04)

(58) Field of Classification Search
CPC ...... F16L 1/207; F16L 1/12; F16L 1/16; F16L 2101/20; Y10T 137/6123
See application file for complete search history.

(56) References Cited

U.S. PATENT DOCUMENTS 3,650,136 A * 3/1972 Sindelar .................. B21D 9/03
72/150
3,724,224 A * 4/1973 Matthews, Jr. ...... E21B 43/0107
405/168.1
(Continued)

FOREIGN PATENT DOCUMENTS

GB 2486026 A 6/2012
GB 2493545 A 2/2013
(Continued)

OTHER PUBLICATIONS

International Preliminary Report on Patentability (Chapter 1) dated Mar. 28, 2019 in corresponding International Application No. PCT/IB2017/001367.
(Continued)

*Primary Examiner* — Kevin R Barss
(74) *Attorney, Agent, or Firm* — Ostrolenk Faber LLP

(57) ABSTRACT

A method of installing an In-Line Structure (ILS) to a fluid-filled pipeline extending from a reel, over an aligner, and through a lay-tower during offshore reeling, the pipeline having an oblique part from the reel to the aligner, and a vertical part from the aligner through the lay-tower, including at least the steps of: (a) draining fluid in the fluid-filled pipeline from the vertical part of the pipeline to create a drained portion of the vertical part of the pipeline up to and around the aligner; (b) cutting the pipeline at or near the draining of step (a) to create upper and lower open ends of the pipeline; (c) installing the In-Line Structure to at least the upper open end of the pipeline; (d) locating a vent hose through a vent port in the In-Line Structure; (e) adding fluid (Continued)

into the drained portion of the pipeline and venting air from the drained portion of the pipeline through the vent hose to wholly or substantially fill the drained portion of the pipeline with the fluid.

11 Claims, 7 Drawing Sheets

(51) Int. Cl.
    *F16L 1/16*     (2006.01)
    *F16L 1/12*     (2006.01)

(56) References Cited

U.S. PATENT DOCUMENTS

| | | | | |
|---|---|---|---|---|
| 5,192,166 | A * | 3/1993 | Persson | F16L 1/20 |
| | | | | 405/168.1 |
| 6,733,208 | B2 | 5/2004 | Stockstill | 405/169 |
| 8,876,433 | B2 * | 11/2014 | Mair | F16L 1/161 |
| | | | | 405/168.3 |
| 10,201,842 | B2 * | 2/2019 | Bombino | F16L 1/20 |
| 10,544,881 | B2 * | 1/2020 | Chalmers | F16L 1/207 |
| 2010/0028085 | A1 * | 2/2010 | Rocher | F16L 13/0263 |
| | | | | 405/169 |
| 2013/0195557 | A1 * | 8/2013 | Bertaso | B21C 37/154 |
| | | | | 405/168.3 |
| 2019/0136671 | A1 * | 5/2019 | Espinasse | E21B 43/013 |

FOREIGN PATENT DOCUMENTS

| | | |
|---|---|---|
| WO | WO 2006/085739 A1 | 8/2006 |
| WO | WO 2006/089786 A1 | 8/2006 |
| WO | WO 2008/072970 A1 | 6/2008 |
| WO | WO 2011/051218 A1 | 5/2011 |
| WO | WO 2011/051221 A1 | 5/2011 |
| WO | WO 2012/073223 A2 | 6/2012 |
| WO | WO 2014/140794 A1 | 9/2014 |
| WO | WO 2015/092383 A1 | 6/2015 |

OTHER PUBLICATIONS

Combined Search and Examination Report dated Mar. 3, 2017 in corresponding United Kingdom Patent Application No. GB1615841.2.

* cited by examiner

METHOD OF INSTALLING AN IN-LINE STRUCTURE IN A PIPELINE

CROSS-REFERENCE TO RELATED APPLICATIONS

The present application is a 35 U.S.C. §§ 371 national phase conversion of PCT/IB2017/001367, filed Sep. 12, 2017, which claims priority to United Kingdom Patent Application No. 1615841.2, filed Sep. 16, 2016, the contents of which are incorporated herein by reference. The PCT International Application was published in the English language.

The present invention generally relates to methods of installing an In-Line Structure in a fluid-filled pipeline extending over a reel on a vessel during offshore reeling, particularly but not exclusively a pipeline having an internal liner. In particular, the methods can be part of averting the wrinkling of an internal liner of the pipeline due to bending during offshore reeling. The invention finds particular utility in the laying of Mechanically Lined (rigid steel) Pipeline (MLP) from a pipelaying vessel.

BACKGROUND TO THE INVENTION

In the reel-lay method of laying an offshore pipeline, the pipeline is provided from a reel or spool on a vessel, towards a lay-tower designed to direct the pipeline down through the lay-tower and through a moonpool in the vessel and into the sea for laying. The lay-tower may be in a 'vertical' position relative to the general plane of the vessel, or at an angle thereto, generally by rotation of the lay-tower at or near a point on the vessel.

At the top of the lay-tower is a circular aligner, typically a large grooved wheel. Thus, the pipeline extends from the reel to the top of the tower in an 'oblique' direction compared to the ship level and the lay-tower, over the lay-tower aligner, and down through the lay tower. For the purposes of the present invention, the portion of the pipeline extending from the aligner and down through the lay-tower shall be defined as a 'vertical' part of the pipeline, independent of the angle of the lay-tower relative to the vessel.

During offshore installation, there may be a requirement to install into the pipeline a device or apparatus, for example an In-Line-Tee (or ILT or 'T-piece'), a manifold, a PipeLine End Termination (PLET) also known as FlowLine End Termination (FLET), or an Abandonment and Recovery Head ('A&R' Head) to perform an abandonment and recovery 'A&R' operation by the addition of the Abandonment and Recovery Head ('A&R' Head) at the end of the pipeline known in the art. For the purposes of the present invention, any such apparatus, pipe, etc. to be installed 'in-line' shall be defined as an In-Line Structure or ILS.

For the installation of such an In-Line Structure (ILS), the unreeling of the pipeline has to be interrupted, the pipeline cut in two parts, adjustment of the space between the cut ends optionally made to match the space required for the In-Line Structure (ILS), the In-Line Structure (ILS) installed between the pipeline's cut ends, before the unreeling of the pipeline can start again.

Where the pipeline is relatively thin or single layered, the change of direction of the pipeline from its oblique part to its vertical part around the lay-tower aligner should not cause any significant damage to the pipeline during laying, such that any movement of the pipeline required to create the space to insert the In-Line Structure (ILS), and the re-start of reel-laying thereafter, is immediately possible. Such an arrangement is shown in for example U.S. Pat. No. 6,733,208, or WO2006/085739A.

However, there are some pipelines where it is desired to have them flooded and typically pressurised during reel-laying to minimise or avoid damage to the pipeline as it changes direction of the pipeline from its oblique part to its vertical part around the lay-tower aligner. The flooding and typical pressurisation of the pipeline with a fluid such as water or MEG, maintains an internal pressure within the pipeline in a manner known in art.

Such pipelines include Mechanically Lined Pipelines (MLP). Pipelines for use in the subsea conveying of fluids such as gas or crude oil are often exposed to the corrosive effects of these fluids which, unless the pipeline is protected by some material resistant to their effect or corrosion, can cause damage to the pipeline and even pipeline failure, which is difficult and expensive to remedy. Corrosion Resistant Alloys (CRA), such as Inconel™ 625, are known to provide resistance to corrosion in extreme environments such as in oil and gas pipelines. To avoid having to unnecessarily provide the entirety of the pipeline as relatively high cost Corrosion Resistant Alloy (CRA), it is known to provide bimetallic pipeline in which an outer, typically carbon steel pipeline is provided as a host pipe, the inner surface of which is protected by a layer of a Corrosion Resistant Alloy (CRA).

It is known to provide bimetallic pipeline by cladding the inner surface of the carbon steel pipeline with a metallurgically bonded Corrosion Resistant Alloy (CRA) layer, or even a weld overlay. However an alternative method, which has in some cases a cost benefit, of producing bimetallic pipeline is to add a liner to the inner surface of the carbon steel pipeline made from Corrosion Resistant Alloy (CRA) or other material. The lining process involves the creation of a mechanical bond between the liner and the pipeline by inserting the liner into a length of the pipeline and hydraulically or mechanically expanding the pipeline and liner together, such that the liner undergoes a plastic deformation while the outer pipeline undergoes an elastic or plastic deformation. Upon relaxation of the expansion force or pressure, an interference contact stress or interference fit is produced at the interface between the liner and the pipe, causing the liner to become mechanically bonded to the internal surface of the pipe.

While a Mechanically Lined Pipeline (MLP) may be preferable from a pipeline manufacturing and cost-effectiveness perspective, a known problem is that, in pipeline construction methodologies that involve reeling the pipeline onto and off a storage spool during production and laying, forces imparted on the pipeline during the reeling process by bending of the pipeline can cause the internal liner to wrinkle. In reeling a Mechanically Lined Pipeline (MLP), significant bending strain is imparted to the pipeline as it is wound onto and unwound from a storage reel which can result in a significant amount of wrinkling in the Corrosion Resistant Alloy (CRA) liner. The wrinkling mechanism may be as a result of, among other things, the bending stress itself, ovalisation of the pipeline cross section, or differential longitudinal compression and strains on the liner along the curvature of the bend due to the periodic circumferential fixation of the liner in the region of the joining welds. This wrinkling is an undesirable result, as the wrinkles can cause mechanical and material issues with the liner (such as embrittlement), as well as causing significant problems within the pipeline during and after the pipeline is commissioned and is in use, which can lead to the failure of the pipeline before the end of its serviceable term.

To avoid wrinkling a reeled Mechanically Lined Pipeline (MLP), it is known that a sufficiently thick Corrosion Resistant Alloy (CRA) or other liner can reduce the likelihood or magnitude of wrinkling, or avoid wrinkling completely, when the pipeline is bent or deformed during laying. Indeed, due to this phenomenon, Corrosion Resistant Alloy (CRA) or lined pipeline is generally chosen for a specific project having a liner thickness sufficient to avoid wrinkling due to the laying process. In the case of corrosion resistant liners, the fundamental thickness of the Corrosion Resistant Alloy (CRA) liner that is required is that which is sufficient to protect against corrosion over the serviceable life of the pipeline, and is dependent on the conditions in which the pipeline is to operate. In many cases the liner thickness that is used is greater than that needed to withstand chemical attack over the serviceable life of the pipeline, or that needed to successfully perform the function of the liner. For example, in the context of reeling a Mechanically Lined Pipeline (MLP) onto and off of a spool, WO 2011/048430A discloses two methodologies for calculating a minimum liner thickness necessary to avert wrinkling during reeling of a Mechanically Lined Pipeline (MLP).

Given that the cost per unit weight of Corrosion Resistant Alloy (CRA) and other liner materials can be very high, the cost of the liner material can become a significant component of the fixed material costs of the pipeline. Thus while using a sufficiently thick liner can reduce wrinkling, it can also lead to the use of a large amount of an expensive liner material. Where a thicker liner than is necessary to avoid corrosion is still used to reduce wrinkling, the amount of liner material used can be far in excess of that needed for the pipeline to function properly and, e.g. to protect against chemical attack during use.

Other possible solutions to avoid wrinkling a reeled Mechanically Lined Pipeline (MLP) during reel-laying are described in WO2008/072970A, WO2011/124919A, WO2011/051221A, WO2011/051218, and WO2010/010390. These include pressurising the entire length of the pipeline as it is reeled onto a storage reel, and later pressurising the entire length of the pipeline as it is unwound from the storage reel, straightened and laid, after which it is depressurised. The pressurisation appears to help prevent the liner from wrinkling due to bending stresses in the pipeline on reeling and unreeling.

Where a pipeline is flooded and pressurised, there is also a need to ensure the safety of the operators while the pipeline is cut and to guarantee the pressurisation of the pipeline during any movement of the pipeline, as well as when the unreeling starts again.

SUMMARY OF THE INVENTION

According to one aspect of the present invention, there is provided a method of installing an In-Line Structure (ILS) to a fluid-filled pipeline extending from a reel, over an aligner, and through a lay-tower during offshore reeling, the pipeline having an oblique part from the reel to the aligner, and a vertical part from the aligner through the lay-tower, comprising at least the steps of:

(a) draining fluid in the fluid-filled pipeline from the vertical part of the pipeline to create a drained portion of the vertical part of the pipeline up to and around the aligner;

(b) cutting the pipeline at or near the draining of step (a) to create upper and lower open ends of the pipeline;

(c) installing the In-Line Structure to at least the upper open end of the pipeline;

(d) locating a vent hose through a vent port in the In-Line Structure;

(e) adding fluid into the drained portion of the pipeline and venting air from the drained portion of the pipeline through the vent hose to wholly or substantially fill the drained portion of the pipeline with the fluid.

Optionally, the method comprises installing the In-Line Structure (ILS) between both the upper and the lower open ends of the pipeline. In this way, after step (f), the offshore reeling of the re-joined pipeline from the vessel can continue.

In an alternative arrangement, the method further comprises the step of installing a second In-Line Structure (ILS) to the lower open end of the pipeline. In this way, the laying of the lower part of the cut pipeline can continue, and the offshore reeling of the upper part of the cut pipeline can continue, optionally at the same or a different time and/or location of the laying of the lower part of the cut pipeline.

Optionally, the flooding fluid in the fluid-filled pipeline is pressurised, and the method further comprises the step of relieving the pressure of the flooding fluid prior to step (a). Further optionally, the flooding fluid in the fluid-filled pipeline is re-pressurised after step (e).

Optionally, the method further comprises forming a hole in the vertical part of the pipeline to allow the draining of the flooding fluid from the vertical part of the pipeline.

Optionally, the method further comprises wholly or substantially removing the vent hose from the pipeline after step (e) and sealing the vent port in the In-Line Structure.

Optionally, the method further comprises adding the flooding fluid in step (e) into the In-Line Structure.

Alternatively optionally, the method further comprises adding the flooding fluid in step (e) into the flooding fluid-filled oblique part of the pipeline.

Optionally, the method further comprises moving the oblique part of the pipeline between step (b) and step (c).

According to another aspect of the present invention, there is provided an apparatus for installing an In-Line Structure (ILS) to a flooding fluid-filled pipeline, extendable from a reel, over an aligner, and through a lay-tower during offshore reeling, the pipeline having an oblique part from the reel to the aligner, and a vertical part from the aligner through the lay-tower the apparatus comprising:

(a) a drain to drain flooding fluid from the vertical part of the pipeline to create a drained portion of the vertical part of the pipeline up to and around the aligner;

(b) a cutter to cut the pipeline at or near the draining of step (a) to create upper and lower open ends of the pipeline;

(c) an In-Line Structure having a vent port to install to at least the upper open end of the pipeline;

(d) a vent hose to be installed in the vent port of the In-Line Structure;

(e) flooding fluid to wholly or substantially refill the drained portion of the pipeline;

(f) a seal to seal the vent port after step (e).

DESCRIPTION OF THE DRAWINGS

The invention can be better understood with reference to the following detailed description together with the appended illustrative drawings in which.

DETAILED DESCRIPTION

Various examples and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group consisting of", "including", or "is" preceding the recitation of the composition, element or group of elements and vice versa.

Figure 1:
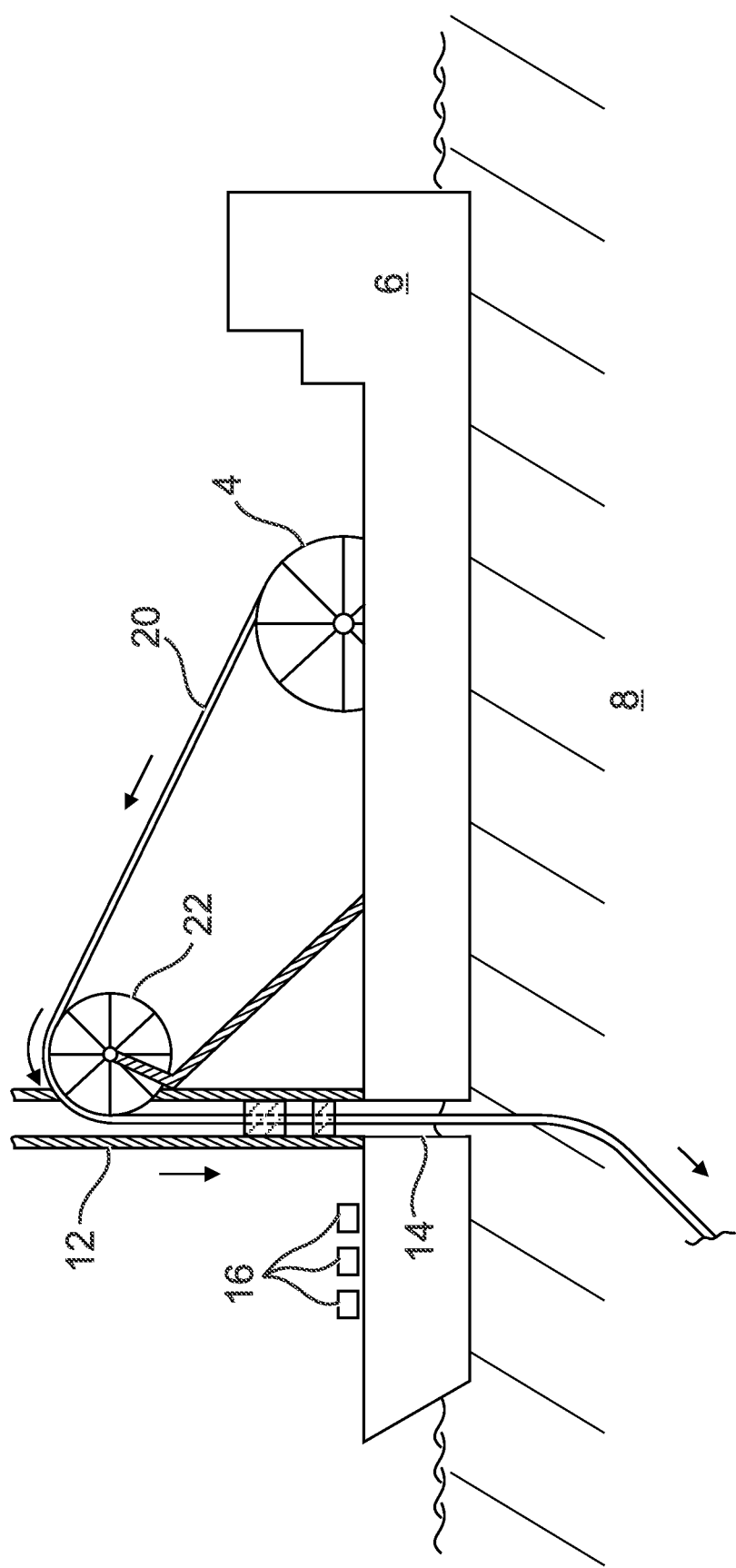
FIG. 1 is a schematic side view of a pipeline extending from a reel, over an aligner, and through a lay-tower during offshore reeling on a vessel.

FIG. 1 shows a method of reel-laying a pipeline 20 from a reel 4 on a vessel 6 in the sea 8. In this method, the pipeline 20 is extended from the reel 4 over an aligner or aligner wheel 22 at or near the top of a lay-tower 12. Thus, the part of the pipeline 20 being laid has an 'oblique part' extending from the reel 4 up to the aligner 10, and a 'vertical part' from the aligner 22 down through the lay-tower 12, (and subsequently through a moonpool 14 or over the side or back of the vessel, and into the sea 8, generally for laying on a seabed (not shown)). This method of reel-laying is commonly faster and more economic than the 'stove-pipe' method of laying, also known as J-lay method, and is therefore preferred where possible. The lay-tower 12 can be rotated to be at a non-vertical angle relative to the vessel 6 in a manner known in the art.

Where the pipeline 20 is relatively flexible, typically small diameter, and would not be affected or misshapen during its change in direction over the aligner 22 and straightening into the vertical pathway of the lay-tower 12, the installation of an In-Line Structure (ILS) 16 (including but not shown an A&R pipe) during laying should only require the clamping of the pipeline 20 in the lay-tower 12 by one or more suitable clamps (not shown), cutting of the pipeline, possibly a small reverse movement of the pipeline back onto the reel to allow sufficient space for insertion of the In-Line Structure (ILS) at the cut, joining of the In-Line Structure (ILS) into the pipeline, and continuation of the reel-laying process.

It is desired to extend the usefulness of reel-laying to further pipelines, including those of increasing outer diameter such as >6 inches (>15 cm), including for example pipeline diameters of 8 inches to 18 inches (20.3 cm to 45.7 cm), and optionally with a liner, including thin wall liners in the range 1-5 mm.

A particular form of bi-metallic pipeline has a main metal tube as a relatively thick outer pipe, typically formed from steel such as carbon steel, and an internal liner having a thickness typically in the range 2.5-3 mm, which is hydraulically or mechanically expanded within the outer pipe to form a Mechanically Lined Pipeline (MLP).

The main metal tube may be any length, including typical stalk lengths of either 12 m, 24 m, 48 m, or possibly longer. The main metal tube may be any internal diameter from 10 cm to 50 cm or greater. The main metal tube may be any thickness from 5 mm to 50 mm or greater. The main metal tube may be formed by extrusion. The main metal tube may be formed from metal ingots which are pierced, for example by broaching, elongated and calibrated, for example by rolling. The main metal tube may be formed from sheet bended generally with U-shape break press then O-shape break press, eventually expanded with an expander, and longitudinally seam welded. The main metal tube may be formed from the assembly of a series of main metal tube stalk butt welded together.

The internal liner aims to provide an effective corrosion-resistant barrier to the internal surface of the pipeline even in an aggressive single, dual and multiphase hydrocarbon environment at temperatures up to 130° C. and at high operating pressures. The liner may be formed of a metal, especially a Corrosion Resistant Alloy (CRA) such as an alloy 316L, Super 13 Cr, 22 Cr duplex, 25 Cr duplex, Alloy 28, Alloy 825, Alloy 2550, Alloy 625, Alloy C-276, or any other suitable corrosion resistant alloy. The thickness of the metallic liner can be in the range 0.5 mm to 3 mm, typically in the range 2.5-3 mm.

For the purpose of expanding the liner within the outer pipe, the liner can be pressurised from the inside, for example by injecting with a pump a pressurized fluid such as water or oil, so as to expand the liner circumferentially to form interference contact stress between the liner and the main metal tube. Generally during the expansion, the liner undergoes a plastic deformation while the main metal tube undergoes either an elastic or a plastic deformation, depending on the manufacturing process. One example of this comprises inserting the liner inside the main metal tube, and expanding the liner radially so that it comes into contact with the main metal tube, and then the main metal tube outer diameter will also expand together with the liner to a pre-determined strain level such that, following relaxation of the internal pressure, an interference contact stress between the liner and the main metal tube remains. Such a rigid pipe is generally known as a Mechanically Lined Pipe (MLP).

It is increasingly desired to extend the usefulness of reel-laying to Mechanically Lined Pipeline (MLP) pipelines.

To avoid wrinkling a reeled Mechanically Lined Pipeline (MLP) as it is straightened from its reel position to a laying position, flooding the Mechanically Lined Pipeline (MLP)

with a suitable flooding fluid such as water or MEG, and typically pressurising the flooding fluid, is beneficial. This is discussed in more detail in for example WO2008/072970A, WO2011/124919A, WO2011/051221A, WO2011/051218, and WO2010/010390A. Typically, the entire Mechanically Lined Pipeline (MLP) pipeline is flooded and pressurised during the reel-laying process.

However, during offshore installation, there may be a requirement to install into the pipeline a device or apparatus, for example an In-Line-Tee (or ILT or 'T-piece'), a manifold, a PipeLine End Termination (PLET) also known as FlowLine End Termination (FLET), or an Abandonment and Recovery Head ('A&R' Head) to perform an abandonment and recovery 'A&R' operation by the addition of the Abandonment and Recovery Head ('A&R' Head) at the end of the pipeline known in the art. For the purposes of the present invention, any such apparatus, pipe, etc. to be installed 'in-line' shall be defined as an In-Line Structure or an ILS.

To install an In-Line Structure (ILS) involves completely cutting through or across the pipeline at least once (once each side or part is held by suitable clamps in the lay-tower), which will relieve the flooding (and any pressurisation) within the pipeline. But re-flooding (and usually re-pressurisation) of the part of the pipeline around the aligner is then required to continue the reel-laying operation. It is possible to relieve the flooding of the whole length of the pipeline, but this then requires the burden of the re-flooding and usually re-pressurisation of the whole length of the pipeline, or at least that part of the pipeline still on the reel, which is an extensive exercise causing a significant delay to the laying operation.

Figure 2:
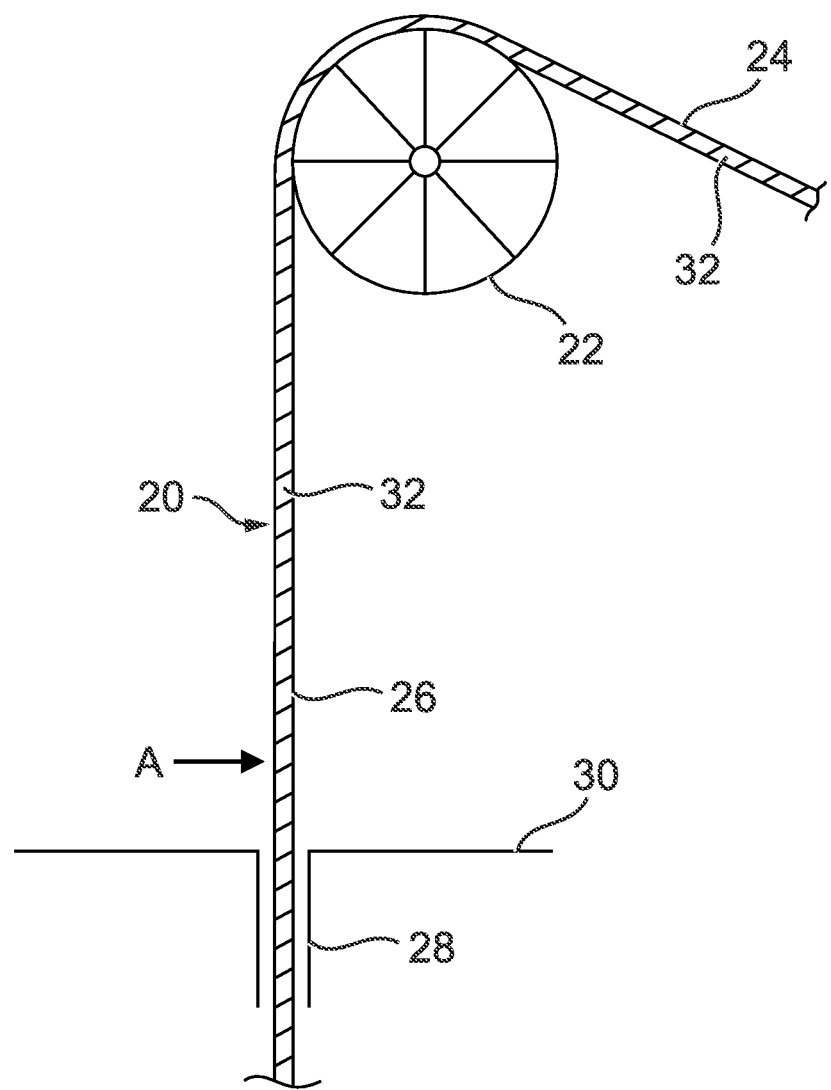
FIG. 2 is schematic cross-sectional view of a portion of a flooded pipeline being installed over an aligner and through a moonpool, showing primary steps of a first embodiment of the present invention.

FIG. 2 shows part of the flooded pipeline 20 extending from the reel 4 on the vessel 6 during offshore reel-laying, such that there is an oblique part 24 extending from the reel to the aligner 22, and a relative 'vertical' part 26 (optionally not being vertical) as it extends from the aligner 22 down through a lay-tower (not shown to assist clarity) and through a moonpool 28 in part of a vessel 30.

The pipeline 20 may be a Mechanically Lined Pipeline (MLP) as described herein or a variant, and is not shown in further detail. During the reel-laying, the pipeline 20 is flooded with a flooding fluid 32 such as water to reduce and/or avoid any internal damage and/or ovalisation to the pipeline as it traverses from its oblique part 24 to its vertical part 26 around the aligner 22 (and any other straighteners known in the art, and not shown herewith). Optionally, the flooding fluid 32 is also pressurised, to enhance the mechanical effect of the fluid against such damage, possibly up to 3 MPa or more. Flooding of the pipeline can be achieved by a suitable entry port into the pipeline 20 at, in or near the reel, and using a suitable pump for any pressurisation desired. Generally there is an end cap or plug etc. at the other end of the pipeline 20.

In a first step of an embodiment of the method of the present invention for installing an In-Line Structure into the fluid-filled pipeline 20, fluid is drained from the vertical part 26 of the pipeline 20. This can be achieved by forming an aperture in the pipeline 20 (once each side or part is held by one or more clamps on the lay-tower 12) at a suitable position such as at arrow A. The aperture could be formed by using a hot stab to form a hole in the pipeline 20, or opening a suitable located vent or other port in the pipeline 20.

Where the flooding fluid 32 is pressurised in the pipeline 20, the pressure could be relieved before making such an aperture, typically at the fluid access point at or near the reel, such that the flooding fluid 32 is then at a lower pressure before draining.

Figure 3:
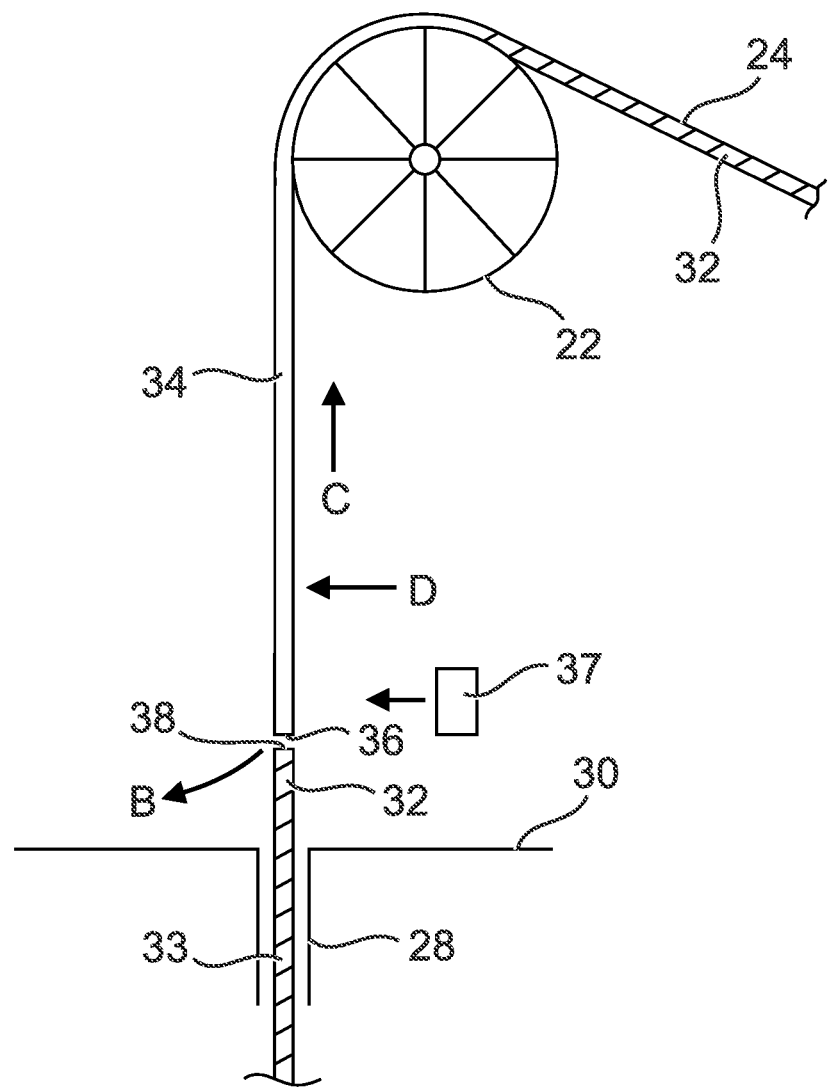
FIG. 3 shows further steps in embodiments of the present invention.

Referring to FIG. 3 the hole at arrow A leads to draining the flooding fluid 32 by gravity from the vertical part 26 of the pipeline 20 as per arrow B to create a drained portion 34 in the vertical portion 26 of the pipeline between the hole and up to the aligner 22. The draining continues until the drainage reaches a 'highest point' at the apex of the pipeline 20 around the aligner 22. Thus, flooding fluid 32 remains in the oblique part 24 of the pipeline.

Once the flooding fluid 32 is drained, the clamped pipeline 20 can be cut to create separate upper and lower pipelines (each to be held by a separate clamp of the lay-tower) to allow the installation of at least one ILS at any suitable position. Cutting through a pipeline can be carried out by any suitable process and apparatus. A grinder, an orbital cutter, or any other suitable cutting apparatus could be used. The cutting creates an upper open end 36 of the upper or reel-end part of the pipeline, and a lower open end 38 of the lower part 33 of the pipeline extending into the sea 8.

There are many types, shapes and design of suitable ILSs for installation by the present invention, although most ILSs have a length in the range 1 to 12 m. FIG. 3 shows a representative ILS 37 to be installed. For a small or smaller length ILS, it is known that a small, minor or de minimus amount (generally being less than 1 m, and preferably less than 0.7 m) of movement of the vertical part 26 of the pipeline 20 is possible in the direction of arrow C, i.e. back onto the reel, without any fluid therein, if required to provide sufficient space between the upper open end 36 and the lower open end 38 of the pipeline 20 to fit the In-Line Structure (ILS) 40 at this stage if desired. Thus, only one cut of the pipeline is necessary.

For larger/longer ILSs, a second cut, for example at arrow D, can be carried out to remove a section of the pipeline 20 and create the space required to fit the longer In-Line Structure (ILS) between the lower open end 38 and a new upper end (not shown) of the pipeline 20.

It may be desired by the operator to make more than one or two cuts for other reasons, and this does not affect the present invention. The first cut and any second cut. cut is typically at or either side of the drilled hole at arrow A.

In an alternative to a second cut, an end cap, typically having a body, one or more sealing elements such as an O-ring of inflatable packer of blade, a pipeline fixation means and a suitable pressurising means and aperture therethrough (not shown), could be added to the upper open end 36 to allow pressurisation of the air in the drained portion 34, (or to allow the injection of another suitable gas or liquid) that provides sufficient internal pressure to allow a greater (than a small, minor or de minimus) amount of movement of the vertical part 26 of the pipeline 20 back over the aligner 22, to provide the required space between the upper open end 36 and the lower open end 38 of the pipeline 20 to fit the In-Line Structure (ILS) at this stage if desired.

Figure 4:
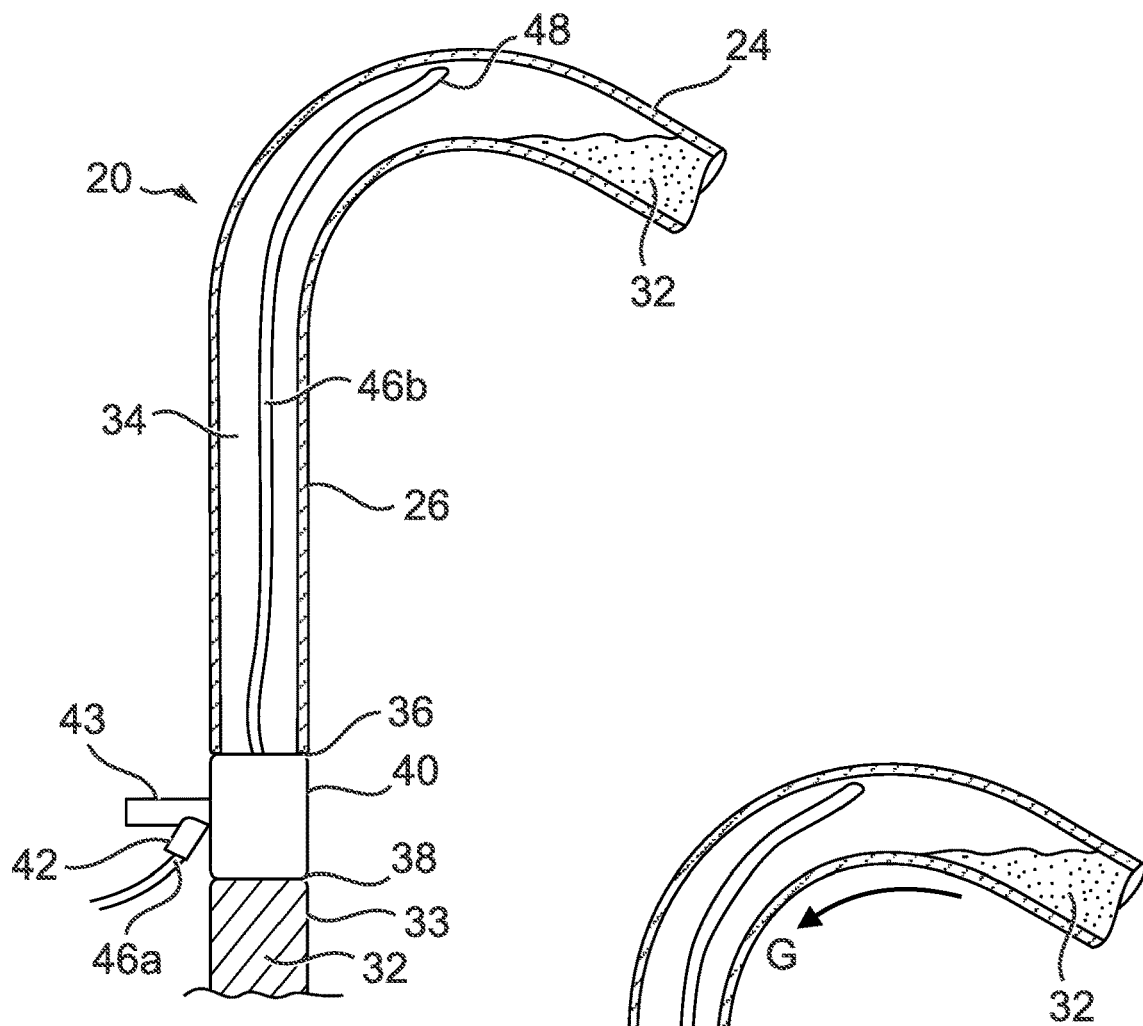
FIGS. 4 and 5 shows further steps in one embodiment method from FIG. 3 on a part of the pipeline in FIG. 3 from its upper open end to the beginning of its oblique part, without the aligner.
Figure 5:
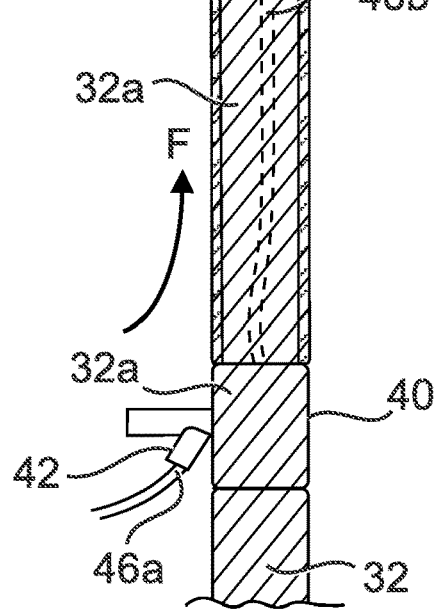

For clarity, FIGS. 4 and 5 show a foreshortened view of the portion of the pipeline 20 between an In-Line Structure and the beginning of the oblique part 24 with fluid 32 therein, also without the aligner 22.

In a first particular embodiment of the present invention, FIG. 4 shows the installation such as by welding of a first In-Line Structure (ILS) such as an In-Line T-piece (ILT) 40 to the previously upper open end 36 of the upper part of the pipeline 20. FIG. 4 shows the installation of the ILT 40 to the lower open end 38 of the lower part of the pipeline 20, to form a re-join or re-continuation of the pipeline 20.

In an alternative operation (not shown), the ILT 40 is first installed for example by welding to the lower open end 38 of the lower part of the pipeline 20. After welding, the ILT 40 can be filled with water from its open top end. A small air gap may be left in order to weld the ILT 40 to the upper end 36 of the pipeline 20 to absence the presence of water during the welding.

The ILT 40 has a typically 'T-port' 43, and also includes a vent port 42. The vent port 42 may be an already integral part of the ILT 40, or a dedicated port added to the ILT 40 for the present invention. The vent port 42 could comprise a relatively angled pipe including a 'stuffing box' arrangement, having fill and drain ports, etc. The 'stuffing box' arrangement allows the sealed passage of a vent hose 46 therethrough.

The vent hose 46 is extended through the stuffing box to have an internal part 46b ending at one end 48 at or near the highest internal part of the pipeline 20, and an external part 46a. The vent hose 46 could be pushed into or pulled out of the pipeline 20 via one or more (hydraulic or electric) cable pushers (not shown). An indicator or mark on the vent hose 46 could also indicate when the end of the vent hose 46 has reached the required high point of the pipeline 20.

The vent hose 46 may be made from rubber or polymer hose, and can be re-enforced with steel armour wires in order to work with the required pressures. The vent hose 46 internal diameter may be in the range 10 mm to 100 mm, and the wall thickness in the range 2 to 5 mm. The vent hose 46 can be stored on a reel prior to entering the pipeline 20. For example, the vent hose 46 could be made of an HDPE inner tube, overwrapped with fiberglass for strength and wear resistance. Such a design is flexible enough to manoeuvre into the pipeline 20, but rigid enough to be pushed up to the highest point.

The vent hose 46 could also have a simple stainless steel fitting on the end to help guide it along the pipeline 20 without damaging the pipeline liner.

New flooding fluid 32a can then be added into the drained portion 34, either by addition to the still fluid-filled oblique part 24 of the pipeline 20 (via a suitable access point or port, generally being at or near the reel, to spill over into the drained portion 3 as per arrow G), or through the ILT 40 as per arrow F, whilst the air trapped in the drained portion 34 can be vented through the end and internal and external parts of the vent hose 48, 46, 46a, to atmosphere, until the new flooding fluid 32a reaches the vent hose end 48, and will be visible by now pouring out of the end of the external part of the vent hose 46a.

After the re-filling, the internal part 46b of the vent hose can be wholly or substantially withdrawn through the stuffing box in the vent port 42, until the end 48 is withdrawn, or at least located in the vent port 42, followed by sealing of the vent port 42 in a manner known in the art.

Figure 6:
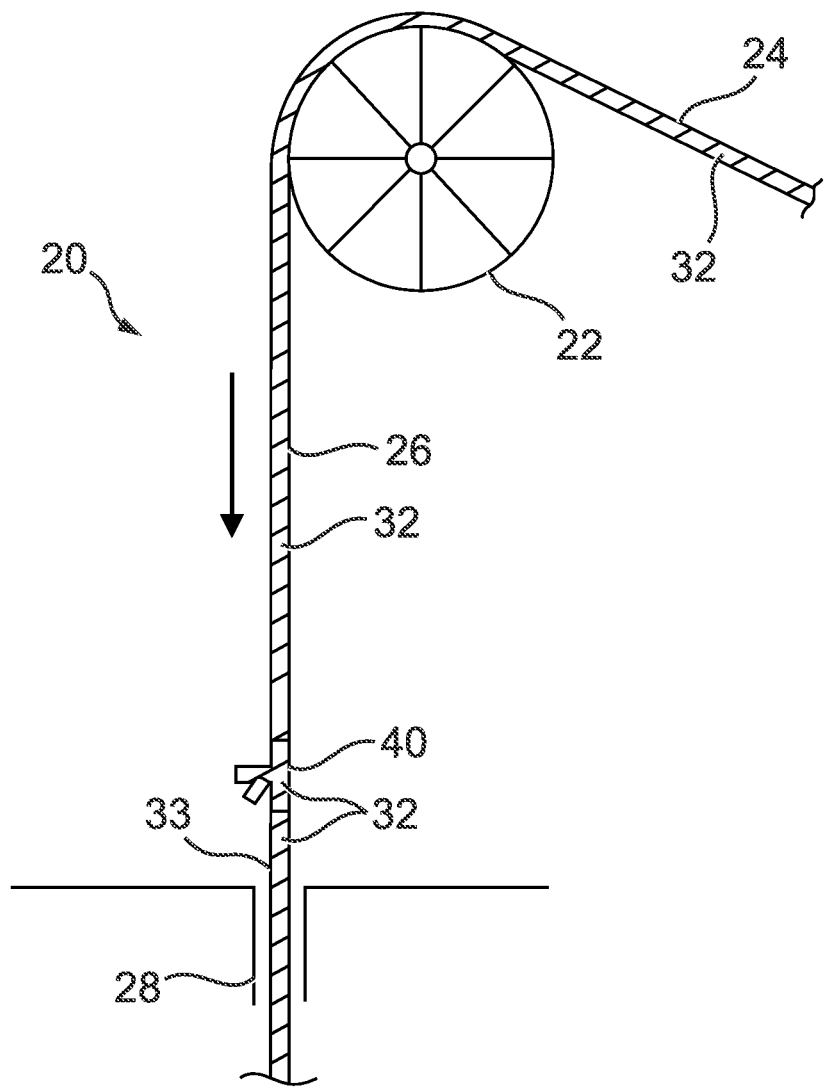
FIG. 6 shows the pipeline of FIGS. 2 and 3 with an installed and flooded In-Line Structure.

In this way, the previously drained portion 34 and the ILT 40 are now wholly or substantially filled with flooding fluid (now all labelled 32), as shown in FIG. 6. Optionally, the flooding fluid 32 can be pressurised by a pump or the like at or near the reel and through a suitable access port as previously discussed. The pipeline 20 is now ready to continue to be reel-layed through the moonpool 28 as shown in FIG. 6.

In a second particular embodiment of the present invention, a second cut of the pipeline 20 is made to remove a section of the pipeline 20, leaving upper and lower open ends of the pipeline, one or which may be the same as upper and lower open ends 36, 38 described herein, to create the space required to fit the longer In-Line Structure (ILS) between the lower open end 38 and a new upper end (not shown) of the pipeline 20. The ILS then re-joins or continues the pipeline 20 as a single pipeline to enable the method of the present invention and for further laying.

In a third particular embodiment of the present invention, a second cut of the pipeline 20 is made to remove a section of the pipeline 20, leaving upper and lower open ends of the pipeline, one or which may be the same as upper and lower open ends 36, 38 described herein. An end ILS or a terminal ILS, such as a PLET, may be added to each of the upper and lower open ends to provide separate pipelines for different laying operations.

Figure 7:
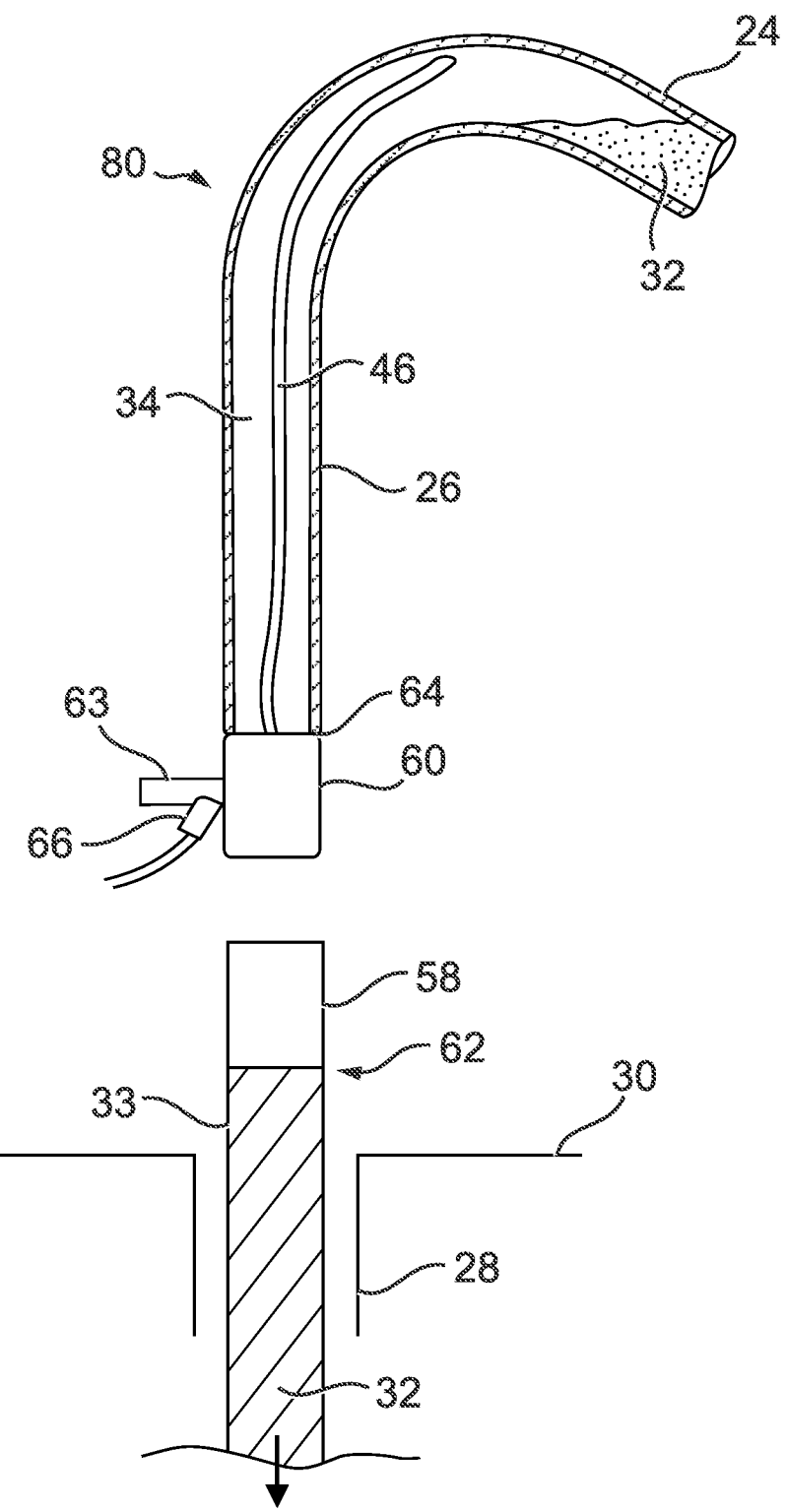
FIGS. 7 and 8 show further steps from FIG. 3 of another embodiment of the present invention.

For example, FIG. 7 shows the addition of a first PLET 58 to the open end 62 of the lower part 33 of the pipeline 20, so that the lower part 33 can then be continued to be laid from the vessel 30 into the sea 8. Either before or after such action, a second PLET 60 is added to the open end 64 of the upper part 80 of the pipeline 20.

Figure 8:
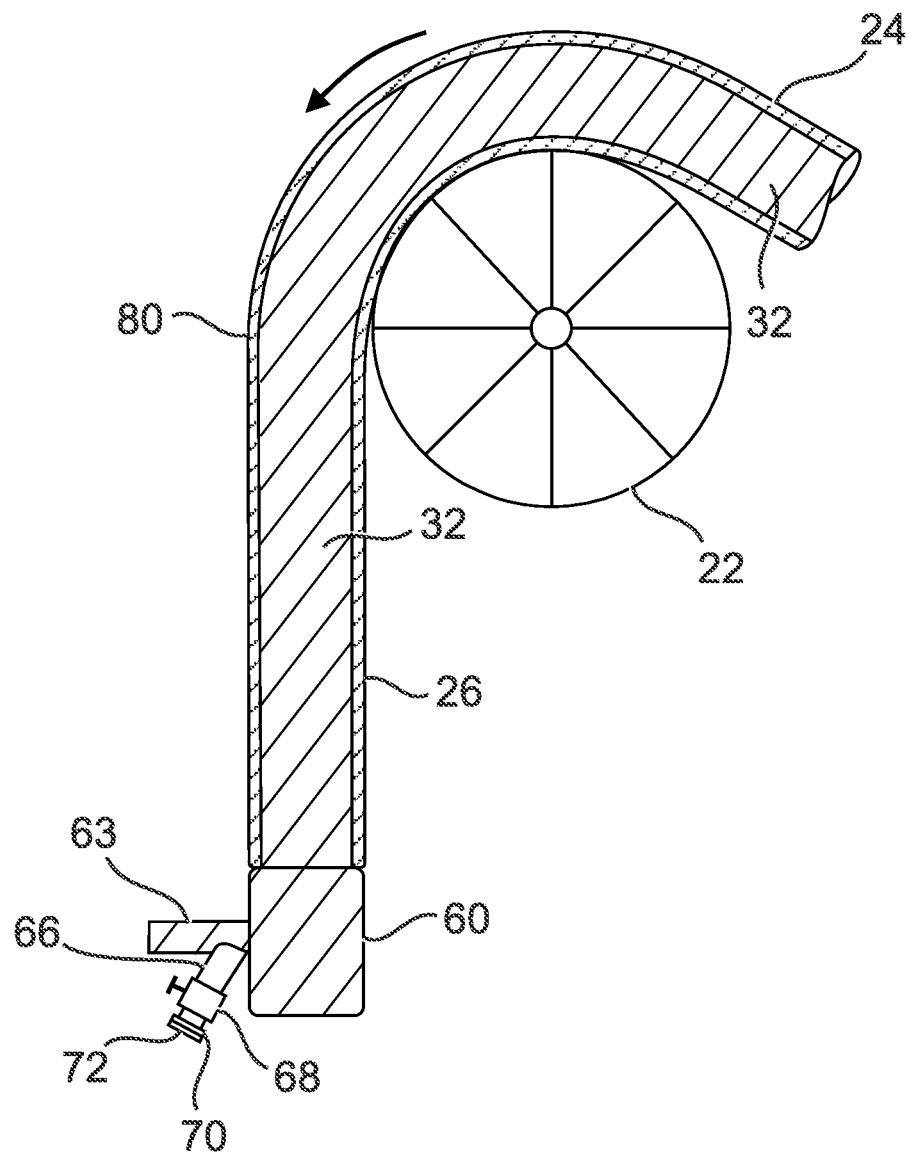

With the installation of the second PLET 60, the operator can proceed with reflooding of the drained portion 34 of the upper pipeline part 80 in accordance with a method of the present invention as described herein, such as the embodiment described hereinabove and based on vent hose 46 passing through a vent port 66 in the second PLET 60, so that the upper pipeline part 80 of the pipeline 20 on the reel 4 is reflooded with flooding fluid 32 as shown in FIG. 8, and is ready to safely pass over the aligner 22 and continue to be reel-layed through the moonpool 28, etc., or the vessel 8 may relocate for reel-laying the remaining pipeline in another location.

FIG. 8 also shows a development of the vent port 66, which could include a T-valve 68 and incorporate a full bore flange 70, so that once the pipeline 20 is reflooded and the vent hose 46 removed, the full bore flange 70 can be closed. A stuffing box or similar could be mounted onto the full bore flange 70, and can be removed once reflooding is achieved, and replaced with a blind flange 72 to provide a second barrier against any leakage.

The present invention provides a method of installing an In-Line Structure (ILS) into a fluid-filled pipeline extending from a reel and over an aligner during offshore reeling, by providing fluid back into the pipeline around the aligner to allow its movement for the installation of the ILS between cut ends. In this way, complete drainage of the entire pipeline is avoided, or at least within the drainage of the pipeline remaining on the reel, whilst allowing movement of the cut pipeline during the installation process.

It can be seen by the discussion herein above and the Figures that the operator has a number of options available, including but not limited to:

one or two cuts of the pipeline to create lower and upper open ends;

using one or two ILSs; and refilling flooding fluid from different entry ports;

and that the operator can use many combinations of these options to achieve different ILS installation and laying alternatives, and all such combinations are within the scope of the present invention.

The invention claimed is:

1. A method of installing an In-Line Structure (ILS) to a fluid-filled pipeline extending from a reel, over an aligner, and through a lay-tower during offshore reeling, the pipeline having an oblique part from the reel to the aligner, and a vertical part from the aligner through the lay-tower, comprising at least the steps of:

(a) draining fluid in the fluid-filled pipeline from the vertical part of the pipeline to create a drained portion of the vertical part of the pipeline up to and around the aligner;
(b) cutting the pipeline at or near the draining of step (a) to create upper and lower open ends of the pipeline;
(c) installing the In-Line Structure to at least the upper open end of the pipeline;
(d) locating a vent hose through a vent port in the In-Line Structure;
(e) adding fluid into the drained portion of the pipeline and venting air from the drained portion of the pipeline through the vent hose to wholly or substantially fill the drained portion of the pipeline with the fluid.

2. The method as claimed in claim 1, comprising installing the In-Line Structure (ILS) between the upper and the lower open ends of the pipeline.

3. The method as claimed in claim 1, further comprising the step of installing a second In-Line Structure (ILS) to the lower open end of the pipeline.

4. The method as claimed in claim 1, wherein the fluid in the fluid-filled pipeline is pressurised, and further comprising the step of relieving the pressure of the fluid prior to step (a).

5. The method as claimed in claim 1, wherein the fluid in the fluid-filled pipeline is pressurized after step (e).

6. The method as claimed in claim 1, further comprising forming a hole in the vertical part of the pipeline to allow the draining of the fluid from the vertical part of the pipeline.

7. The method as claimed in claim 1, further comprising wholly or substantially removing the vent hose from the pipeline after step (e) and sealing the vent port in the In-Line Structure.

8. The method as claimed in claim 1, further comprising adding the fluid in step (e) into the In-Line Structure.

9. The method as claimed in claim 1, further comprising adding the fluid in step (e) into the fluid-filled oblique part of the pipeline.

10. The method as claimed in claim 1, further comprising moving the oblique part of the pipeline between step (b) and step (c).

11. The method as claimed in claim 1, further comprising cutting the pipeline to remove a portion of the pipeline greater than the length of the In-Line Structure.

\* \* \* \* \*